(12) United States Patent
Maxwell et al.

(10) Patent No.: US 12,270,334 B2
(45) Date of Patent: Apr. 8, 2025

(54) SHAPEABLE INLET MANIFOLD FOR HYPERSONIC SCRAMJET

(71) Applicant: The Government of the United States of America, as represented by the Secretary of the Navy, Arlington, VA (US)

(72) Inventors: Jesse R Maxwell, Washington, DC (US); Gabriel B Goodwin, Washington, DC (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 344 days.

(21) Appl. No.: 15/869,932

(22) Filed: Jan. 12, 2018

(65) Prior Publication Data

US 2019/0331024 A1    Oct. 31, 2019

Related U.S. Application Data

(60) Provisional application No. 62/445,542, filed on Jan. 12, 2017.

(51) Int. Cl.
*F02C 7/042*    (2006.01)
*F02K 7/10*    (2006.01)

(52) U.S. Cl.
CPC ............... *F02C 7/042* (2013.01); *F02K 7/10* (2013.01)

(58) Field of Classification Search
CPC .. F02C 7/04; F02C 7/042; F02C 7/057; F02C 9/44; F05D 2270/122; F02K 7/10; F02K 7/14; F02K 7/16; F02K 7/18

USPC ............................................... 137/15.1, 15.2
See application file for complete search history.

(56) References Cited

U.S. PATENT DOCUMENTS

| | | | | |
|---|---|---|---|---|
| 3,141,300 A | * | 7/1964 | Turcat | F02C 7/057 |
| | | | | 73/178 R |
| 3,447,325 A | * | 6/1969 | Tiley | F02C 7/057 |
| | | | | 60/242 |
| 3,450,141 A | * | 6/1969 | Braendlein | F02C 7/042 |
| | | | | 137/15.2 |
| 3,974,648 A | * | 8/1976 | Kepler | F02K 7/10 |
| | | | | 60/204 |
| 4,277,940 A | * | 7/1981 | Harner | F02C 9/44 |
| | | | | 60/243 |

(Continued)

FOREIGN PATENT DOCUMENTS

CN    104632411 A  *  5/2015

OTHER PUBLICATIONS

Lunan et al., Waverider, A revised Chronology, 2015, AIAA, p. 1 (Year: 2015).*

*Primary Examiner* — Jason H Duger
(74) *Attorney, Agent, or Firm* — US Naval Research Laboratory; Jorie L. Stroup

(57) ABSTRACT

A shapeable inlet manifold for a hypersonic scramjet includes an inlet lower cowling; a mount surface; and an inlet stream surface movably coupled to the mount surface, wherein the inlet lower cowling and the inlet stream surface define an opening of the shapeable inlet manifold allowing fluid flow therethrough. The inlet stream surface has first and second dispositions relative to the lower cowling defining first and second shapes of the opening, thereby providing respective first and second flow characteristics through the inlet manifold during flight.

12 Claims, 24 Drawing Sheets

(56) References Cited

U.S. PATENT DOCUMENTS

| | | | | | |
|---|---|---|---|---|---|
| 4,523,603 | A | * | 6/1985 | Peikert | B64D 33/02 137/15.2 |
| 4,641,678 | A | * | 2/1987 | Haas | B64D 33/02 137/15.1 |
| 4,991,795 | A | * | 2/1991 | Koncsek | B64D 33/02 137/15.1 |
| 5,004,187 | A | * | 4/1991 | Falempin | B64D 33/02 244/53 B |
| 5,005,782 | A | * | 4/1991 | Falempin | B64D 33/02 137/15.1 |
| 5,033,693 | A | * | 7/1991 | Livingston | B64D 33/02 244/53 B |
| 5,078,341 | A | * | 1/1992 | Bichler | B64D 33/02 137/15.1 |
| 5,214,914 | A | * | 6/1993 | Billig | F02C 7/042 137/15.1 |
| 5,586,735 | A | * | 12/1996 | Falempin | B64D 33/02 137/15.1 |
| 6,634,594 | B1 | * | 10/2003 | Bowcutt | B64C 3/10 244/35 A |
| 6,880,342 | B1 | * | 4/2005 | Moorhouse | F02C 7/04 137/15.2 |
| 6,883,330 | B2 | * | 4/2005 | Guinan | F02K 7/14 60/767 |
| 7,866,599 | B2 | * | 1/2011 | Elvin | B64C 30/00 244/53 B |
| 2009/0114774 | A1 | * | 5/2009 | Dyer | B64D 33/02 244/53 B |

\* cited by examiner

| Case study free stream and stagnation conditions |||||||
|---|---|---|---|---|---|
| Altitude [km] | Mach Number | $T_\infty$ [K] | $T_0$ [K] | $P_\infty$ [Pa] | $P_0$ [Pa] |
| 30 | 5 | 231.66 | 1392.8 | 1313.4 | 23001 |
|  | 6 |  | 1903.7 |  | 33122 |
|  | 7 |  | 2507.5 |  | 45082 |
|  | 8 |  | 3204.2 |  | 58883 |

FIG. 15

SHAPEABLE INLET MANIFOLD FOR HYPERSONIC SCRAMJET

RELATED APPLICATIONS

This application claims the benefit of U.S. Provisional Application No. 62/445,542 filed Jan. 12, 2017, which is hereby incorporated herein by reference.

FIELD OF INVENTION

The present invention relates generally to hypersonic scramjets, and more particularly to shapeable inlet manifolds for hypersonic scramjets.

BACKGROUND

The scramjet engine represents a significant enabling technology for the future of high speed atmospheric flight and the potential for reducing costs for both space access and hypervelocity transport. The ability of "airbreathing" propulsion systems to gather oxygen as they fly immersed in Earth's atmosphere rather than store oxidizer onboard as rockets are required to do results in as much as nine times less fuel mass required for the same thrust when compared to rocketry, for otherwise identical geometry and mass. While more efficient than rocketry, scramjets also do not require a compressor assembly with mechanical moving parts as does the turbojet engine; rather, it relies on the passive ram compression of air at high flight speeds to feed the combustor. The omission of an active compressor means that the scramjet cannot produce thrust at low speeds due to low ram pressure, but has a significant advantage at high speeds for which the temperatures and stresses that limit turbojet performance are much less of a concern. As with the turbojet, the scramjet is based on the Brayton Cycle. The air at the inlet is isentropically compressed, mixed with fuel and combusted, then the high temperature gases are expanded through the exit nozzle, and expelled high velocity combustion products produce thrust for vehicle propulsion. A simplified schematic of a conventional scramjet engine is shown at FIG. 1 and the Brayton Cycle is shown at FIG. 2.

The hypersonic waverider describes a class of forebody geometry for which a shock is attached everywhere along the leading edge and the post-shock conditions in the near-body flow field are everywhere supersonic. The post-shock flow field captured between the waverider lower surface and the shock surface results in a significant pressure increase that can be beneficial for airbreathing propulsion systems that rely on ram compression such as the scramjet engine. Such a benefit was realized in the Boeing X-51 WaveRider scramjet demonstrator, which implemented a waverider nosetip for compression ahead of the inlet. Scramjets, however, are point-designed engines, intended to operate most efficiently at a constant dynamic pressure; too low dynamic pressure may result in insufficient thrust and aerodynamic forces to sustain steady cruise as well as reduced combustion efficiency, while too high dynamic pressure may produce stagnation and internal temperatures and pressures that the vehicle materials cannot survive in addition to substantially higher fuel consumption. This results in a preferred altitude-airspeed injective relation that cannot be deviated from without incurring these penalties. A waverider inlet manifold, while beneficial for air compression, is also a point-designed geometry that is a strong function of Mach number.

SUMMARY OF INVENTION

To circumvent these design restrictions, a shapeable inner surface at the inlet manifold is proposed that maintains the on-design operation for the waverider nosetip of a scramjet inlet which acts to both compress the air and yield sufficient inlet-averaged conditions to enable a scramjet combustor to operate on-design despite variable external flight conditions. The resulting insensitivity to flight conditions effectively enables scramjets to achieve a design range rather than a design point, expanding the injective altitude-airspeed function into a surjective flight envelope as is common for conventional aircraft and propulsion systems.

According to one aspect of the invention, a shapeable inlet manifold for a hypersonic scramjet includes an inlet lower cowling; a mount surface; and an inlet stream surface movably coupled to the mount surface, wherein the inlet lower cowling and the inlet stream surface define an opening of the shapeable inlet manifold allowing fluid flow therethrough. The inlet stream surface has first and second dispositions relative to the lower cowling defining first and second shapes of the opening, thereby providing respective first and second flow characteristics through the inlet manifold during flight.

Optionally, the shapeable inlet manifold further includes an electronic controller configured to control the inlet stream surface to maintain leading edge shock attachment at the inlet, thereby providing optimum aerodynamic performance as a waverider as flight Mach number changes.

Optionally, the electronic controller is configured to perform the steps of: measuring a flight Mach number; comparing the measured Mach number to a current Mach-number-specified-by-position; adjusting the inlet stream surface of the shapeable inlet manifold towards a desired disposition based on the comparing; and iteratively ensuring that the flight Mach number matches the Mach-number-specified-by-position by correcting the disposition of the inner stream surface until a difference between the Mach numbers is within a predetermined tolerance.

Optionally, a change from the first disposition to the second disposition includes a change in location of the inlet stream surface with respect to the inlet lower cowling.

Optionally, a change from the first disposition to the second disposition includes a change in shape of the inlet stream surface.

Optionally, the shapeable inlet manifold includes one or more actuators attached to the mount surface and to the inlet stream surface and configured to actuate the inlet stream surface from the first disposition to the second disposition.

Optionally, the one or more actuators are linear actuators.

Optionally, the inlet stream surface is a continuous flexible surface.

Optionally, the inlet stream surface comprises a plurality of rigid tiles.

Optionally, the inlet stream surface is configured to change from the first disposition to the second disposition via temperature-based shaping based on differences in local stiffness.

According to another aspect of the invention, a method of controlling the shape of a shapeable inlet manifold for a hypersonic scramjet includes measuring a flight Mach number; comparing the measured Mach number to a current Mach-number-specified-by-position; adjusting an inner stream surface of the shapeable inlet manifold towards a desired disposition based on the comparing; and iteratively ensuring that the flight Mach number matches the Mach-number-specified-by-position by correcting the disposition of the inner stream surface until a difference between the Mach numbers is within a predetermined tolerance.

The foregoing and other features of the invention are hereinafter described in greater detail with reference to the accompanying drawings.

BRIEF DESCRIPTION OF THE DRAWINGS

FIG. 15 shows a table of example free stream and stagnation conditions.

DETAILED DESCRIPTION

Figure 1:
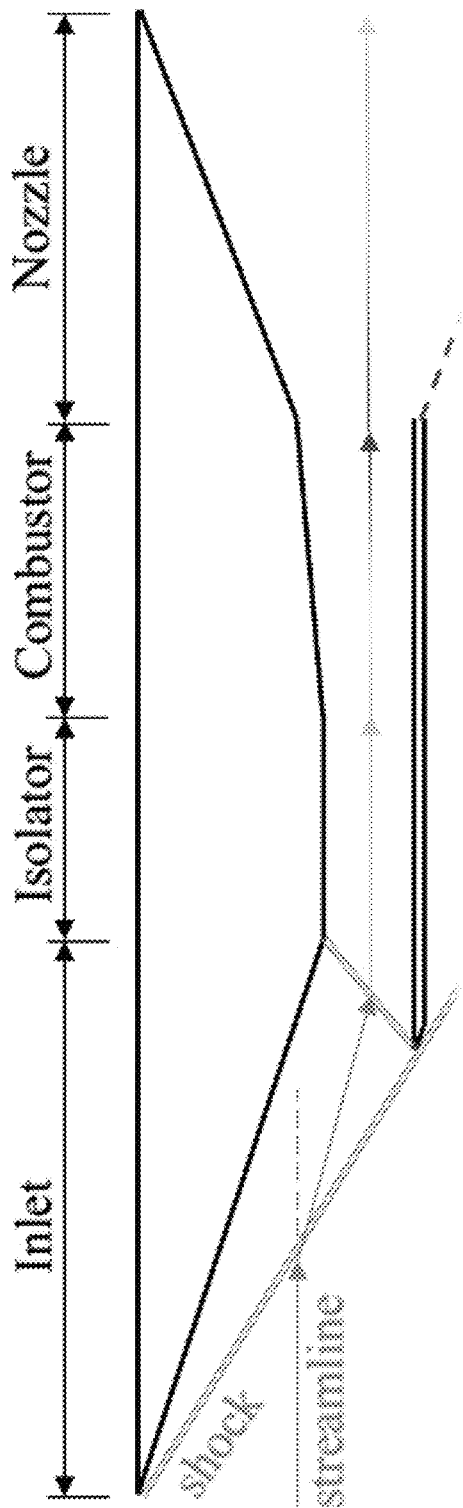
FIG. 1 shows a scramjet engine schematic.
Figure 2:
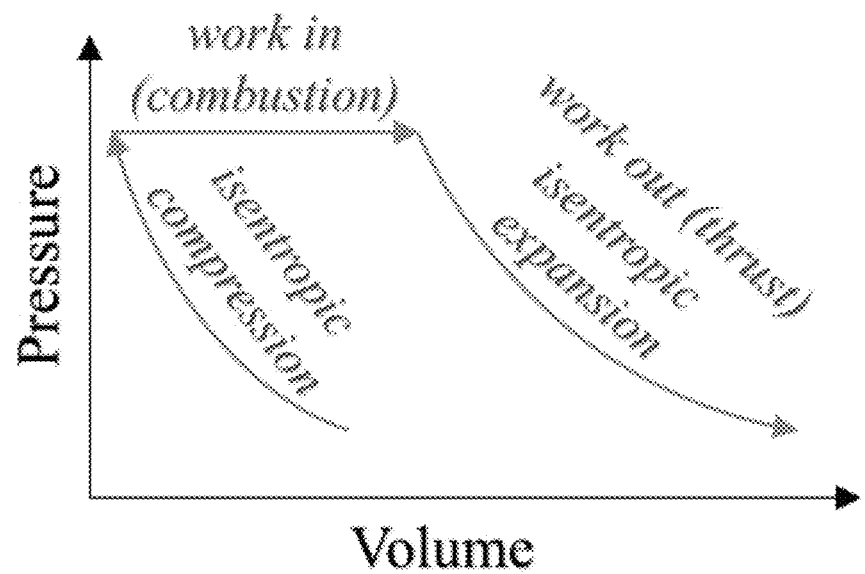
FIG. 2 shows the Brayton Cycle.
Figure 3:
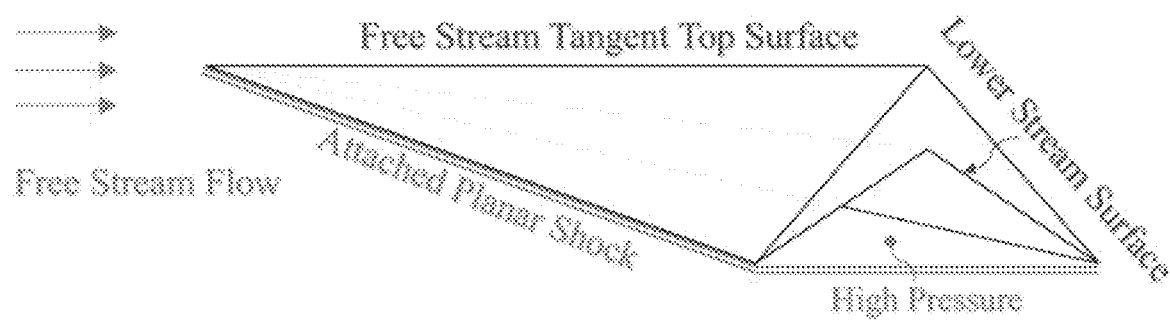
FIG. 3 shows a waverider schematic.
Figure 4:
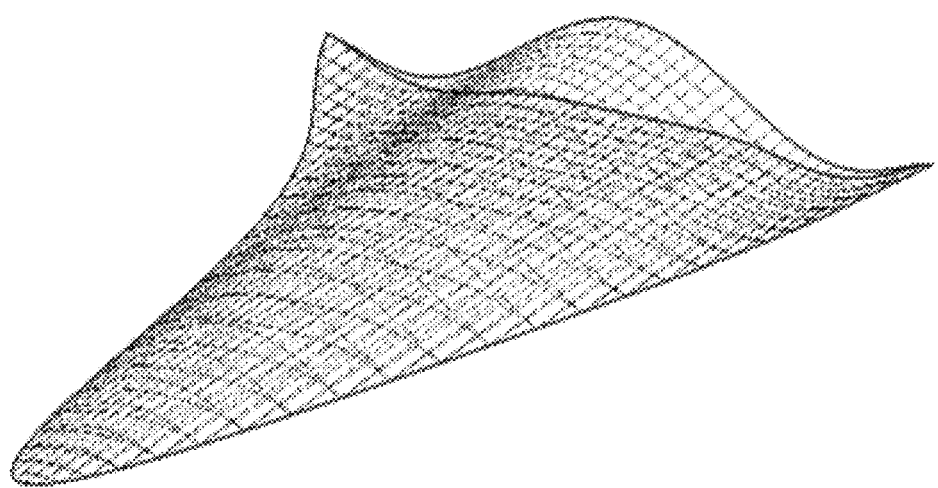
FIG. 4 shows a Mach 6 conical-shock-derived waverider.

The hypersonic waverider describes a class of forebody geometry for which a shock is attached everywhere along the leading edge and the post-shock conditions in the near-body flow field are everywhere supersonic. The post-shock flow field captured between the waverider lower surface and the shock surface results in a significant pressure increase that can be beneficial for performance metrics such as lift, drag, and their ratios. A schematic of the original "caret-type" planar shock waverider is depicted in FIG. 3, and an example Mach 6 hypersonic waverider derived from a 12° conical shock that achieves a lift-to-drag ratio of 10.0 at a flight dynamic pressure of 50 kPa based on pioneering viscous-optimization is depicted in FIG. 4. The compression of air past the shock as well as the retention of the high-pressure air between the body stream surface and the shock may prove to be useful for airbreathing propulsion systems that rely on ram compression such as the scramjet engine. As observed in FIG. 1, the scramjet inlet conditions are dependent upon the free stream conditions, which are strong functions of flight dynamic pressure and Mach number. Shaping of a flexible lower stream surface for a hypersonic waverider can result in on-design operation despite deviations from the original design Mach number, provided that service temperatures and stresses during flexure are kept within tolerable limits. This concept may be applied to the inlet of an exemplary.

Figure 5:
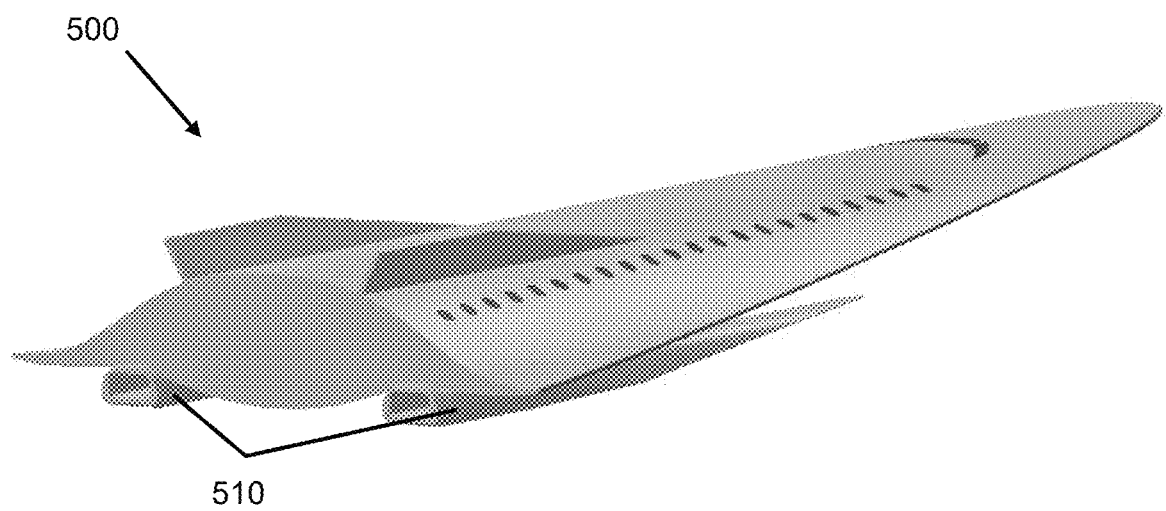
FIG. 5 shows an exemplary waverider-derived hypersonic transport with integrated shapeable scramjet engines.

The proposed concepts are applicable, for example, to hypersonic cruise and transport vehicles that are intended to operate within a design envelope as conventional aircraft, illustrated in FIG. 5 at 500. The exemplary waverider-derived hypersonic transport 500 includes integrated exemplary shapeable scramjet engines 510. For illustrative purposes, the present discussion will use conventional design values of 50-100 kPa for the design operating conditions at the scramjet inlet, and will parametrically illustrate various inlet shapes and the resulting range of inlet conditions produced that would be favorable for scramjet propulsion.

Figure 6:
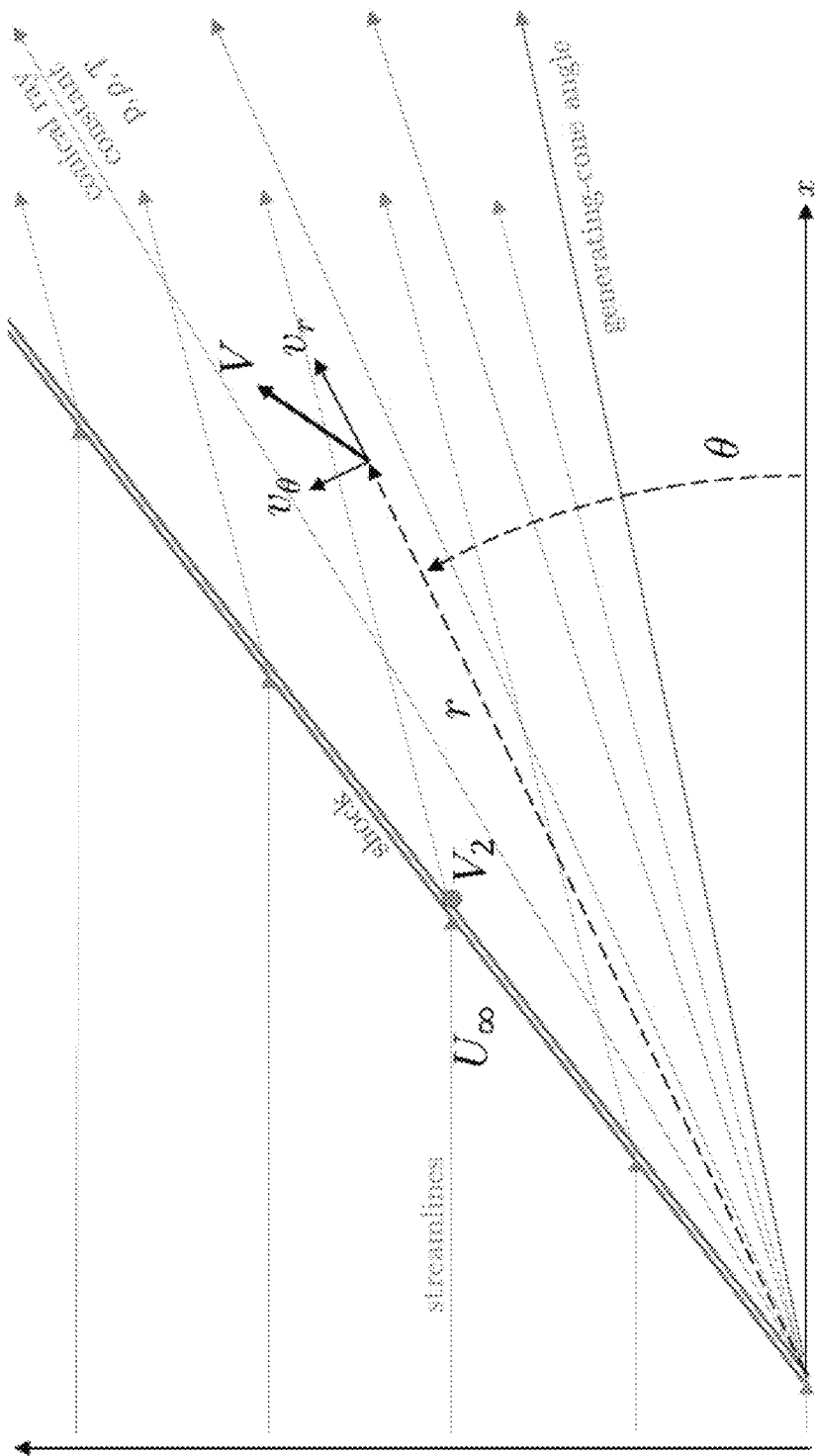
FIG. 6 shows a Taylor-Maccoll inviscid cone similarity solution.

The Taylor-Maccoll similarity solution for the inviscid supersonic flow field about an axisymmetric cone at zero angle of attack is used as the basis of constructing the waverider inlet manifold derived from conical shocks. The construction of the solution is outlined in FIG. 6, illustrating the constant flow field properties along a conical ray in the two-dimensional representation. In this figure, $U_\infty$=free stream velocity [m/s], V=velocity [m/s], $v_\theta$=velocity tangent to a ray [m/s], $v_r$=velocity along a ray [m/s], r=radial coordinate [m], θ=angle from the conical axis [rad], p=pressure [Pa], ρ=density[kg/m$^3$], and T=temperature [K].

Figure 7:
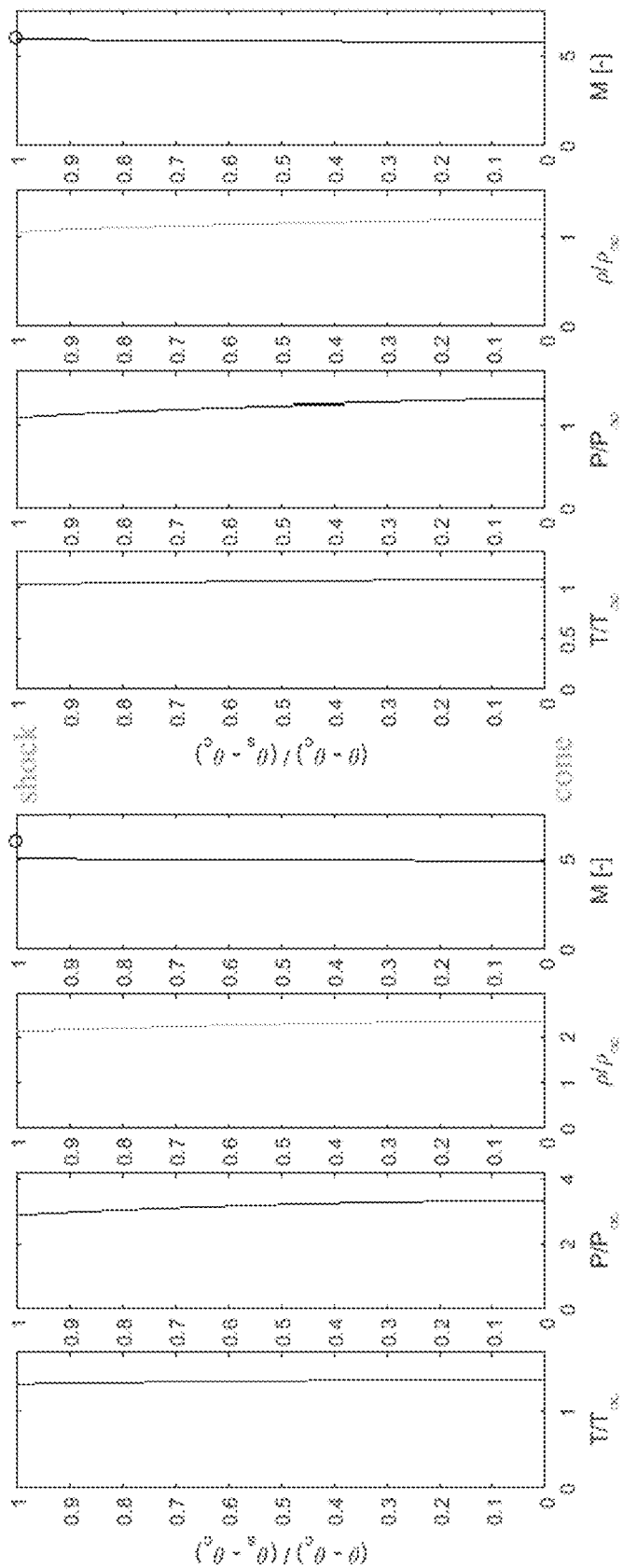
FIG. 7 shows a Taylor-Maccoll similarity solution for 15° (left) and 10° (right) shock at Mach 6 and 30 km.

An example similarity solution in the context of flow field variables between the generating-cone angle and the shock angle is presented in FIG. 7. An inspection of FIG. 7 prompts the discussion of two concepts: first, the variation in conditions produced in the entire post-shock flow field may be too large to be useful for scramjet propulsion, since the combustion processes are strong functions of temperature and pressure. For this particular case, the extrema are relatively close to the average value for the Mach number and temperature, but the pressure and density span a wide range throughout the post-shock near-body flow field, suggesting that the inlet area-averaged values may not sufficiently characterize the flow physics for processes such as combustion that are very sensitive to local density and pressure and their gradients. Secondly, the desirable high-pressure and moderate-temperature conditions are found near the imaginary generating-body's surface, whereas the lower pressure conditions that are less desirable for compression ratio but more desirable for lower temperature conditions are found near the shock. This suggests that it should be favorable for a temperature-limited vehicle to construct a low-profile inlet near the shock to minimize the variation in the radial direction as well as design a waverider to operate as close to the shock surface as possible to capture the relatively low temperature in that region. Conversely, it is undesirable to operate near the imaginary generating cone's body since the flow field conditions approach less desirable values for temperature and will adversely affect the inlet area-averaged values in terms of gradients as well as increase in pressure drag. Simultaneous consideration must be given to the compression ratio, which is maximized for a fixed shock angle by capturing more near-body flow field at the expense of higher temperature and drag as well as larger gradients. Near-shock design therefore results in minimal temperature and drag with low compression ratio, whereas near-body design results in higher temperature and drag with an increase in compression ratio and drag.

Figure 8:
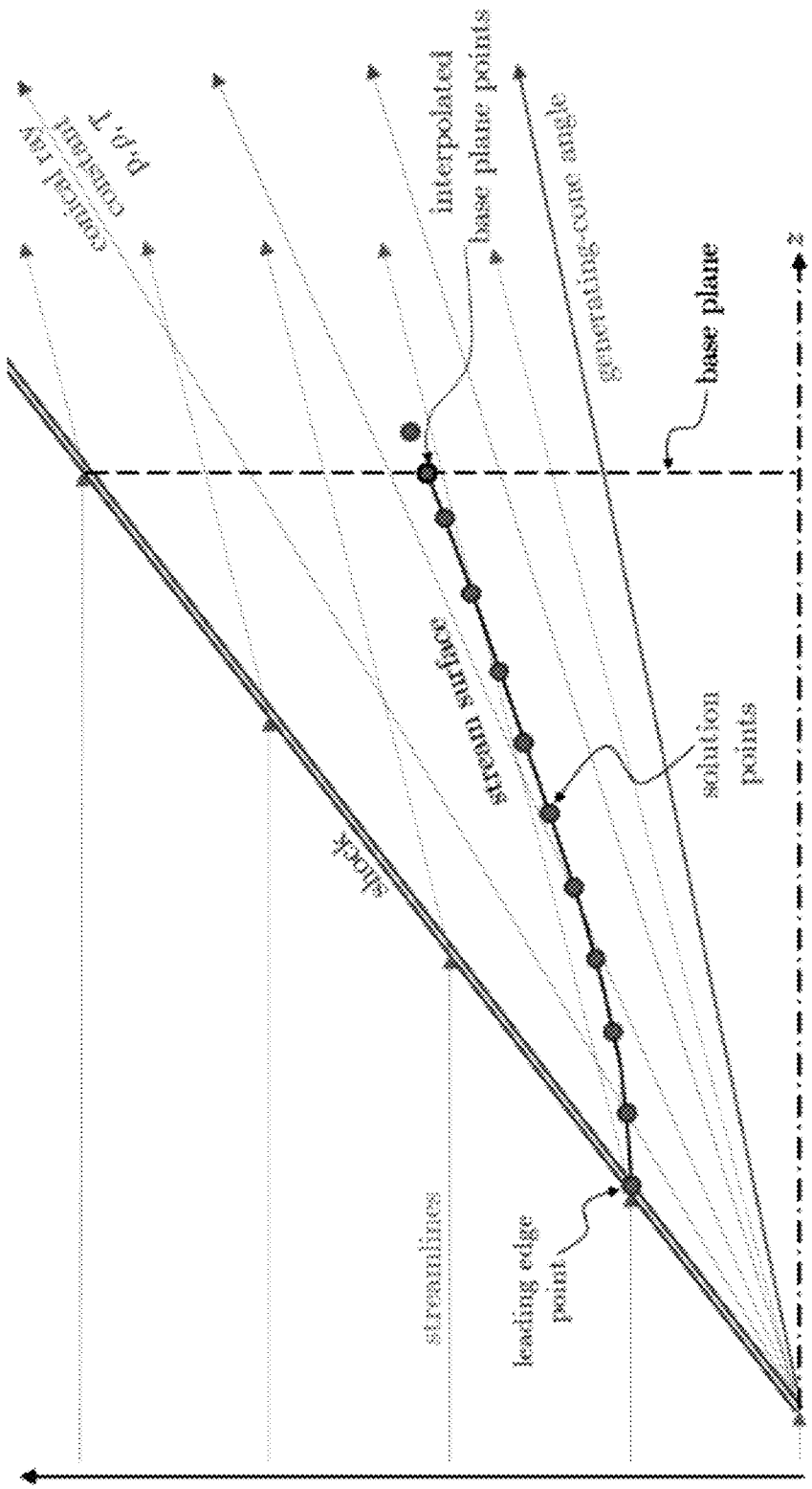
FIG. 8 shows stream surface integration from leading edge points.

The top surface and leading edge, both rigid, are designed by specifying a generating curve in a reference base plane that coincides with the inlet cross-section plane at the isolator. The leading edge is determined by projecting this generating curve onto a conical shock of specified angle and subject to the constraints of minimum shock angle as a function of Mach number and maximum attached-shock angle. The internal surface of the waverider inlet is shaped by the stream surface of the incoming flow, based on a "no-disturbance" criteria. The stream surface is computed by tracing streamlines emanating from the leading edge of the vehicle, illustrated in FIG. 8, to the base plane of the generating curve where the inlet conditions are defined on the base plane between the inlet manifold inner surface and the shock.

Figure 9:
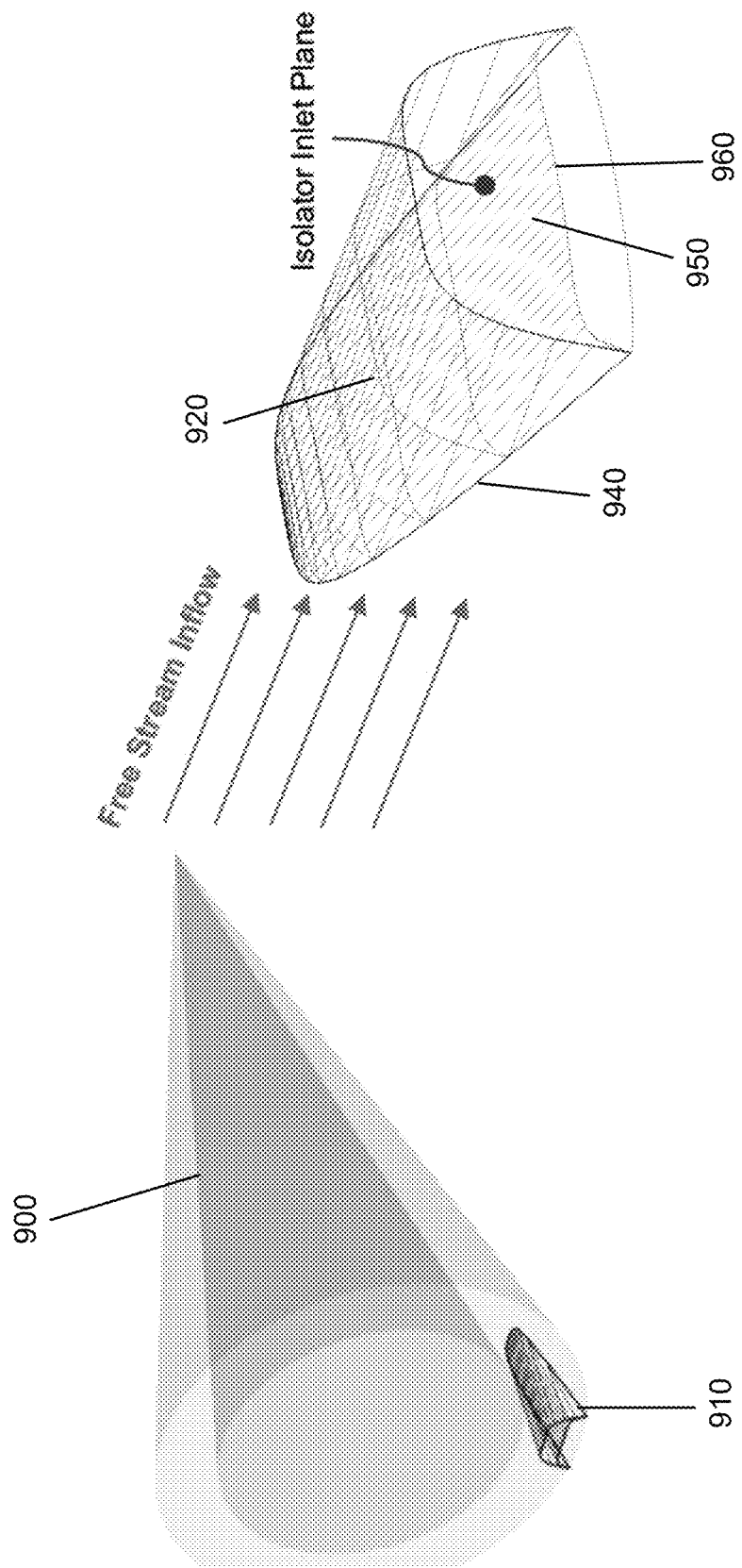
FIG. 9 shows an example conical shock-derived waverider inlet in imaginary generating flow field (left), and resulting geometry (right)

A depiction of the conical-shock-derived waverider inlet manifold, the imaginary generating cone 900, and the corresponding design shock surface 910, are all depicted in the left half of FIG. 9, while a magnified view of the resulting geometry is presented as a wireframe model 920 in the right half of FIG. 9 in order to illustrate the generating curve, the leading edge 940, the shapeable lower surface 950, and the corresponding inlet profile 960. While the practical implementation of a waverider geometry necessitates rounding of the leading edge for surviving extreme heating rates in the hypersonic regime, the sharp-edged models used in the present work are intended to provide an approximate characterization for evaluating general usefulness.

The flight conditions considered herein are derived from the 1976 US Standard Atmosphere and a practical design range across altitude and Mach number for a hypersonic transport. The altitude is investigated between 20 km and 50 km and the Mach number between 5 and 8.

Figure 10:
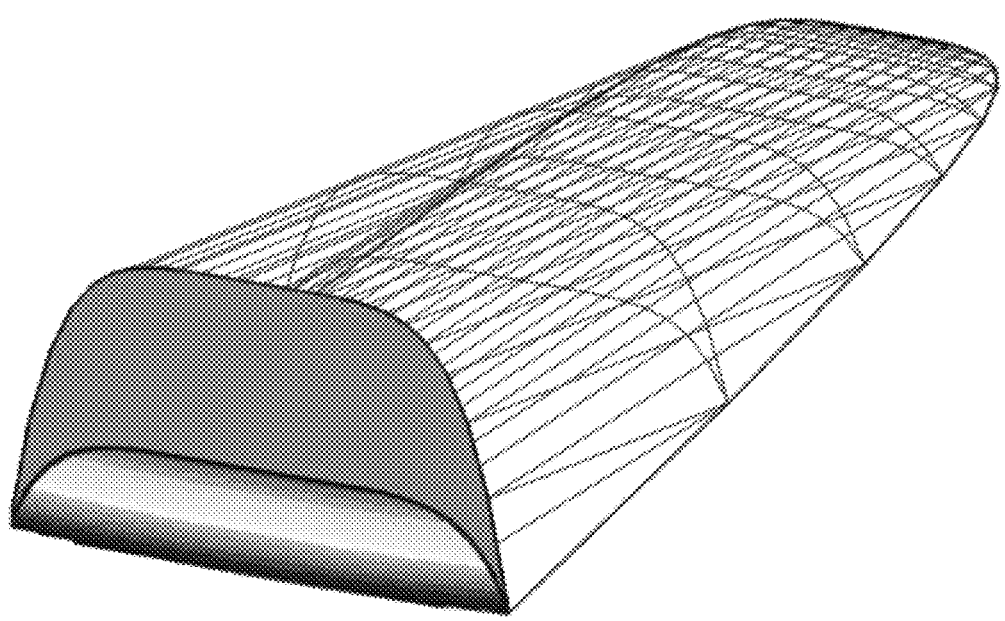
FIG. 10 shows an example isolator inlet cross section Mach contour.

The conditions at the inlet are mapped from the inviscid Taylor-Maccoll similarity solution for the conical flow field and the maximum, minimum, average, and relative variation of the temperature, pressure, dynamic pressure, Reynolds number, and Mach number are the metrics used to characterize the inlet conditions. A viscous correlation provides an estimate for the viscous drag to accompany the pressure-driven lift and drag forces for the waverider nosetip. (It is noted that the same viscous correlation can be applied to the skin friction component of drag for the downstream section of a vehicle that is eclipsed by the waverider leading edge.) The waverider inlet model is parametrically computed for various generating curves and flight conditions to investigate the range of inlet conditions available for a particular range of flexibility for the inlet manifold. The location of the cross sections taken for isolator inlet conditions is illustrated in FIG. 10 for a qualitative Mach number contour.

Figure 11:
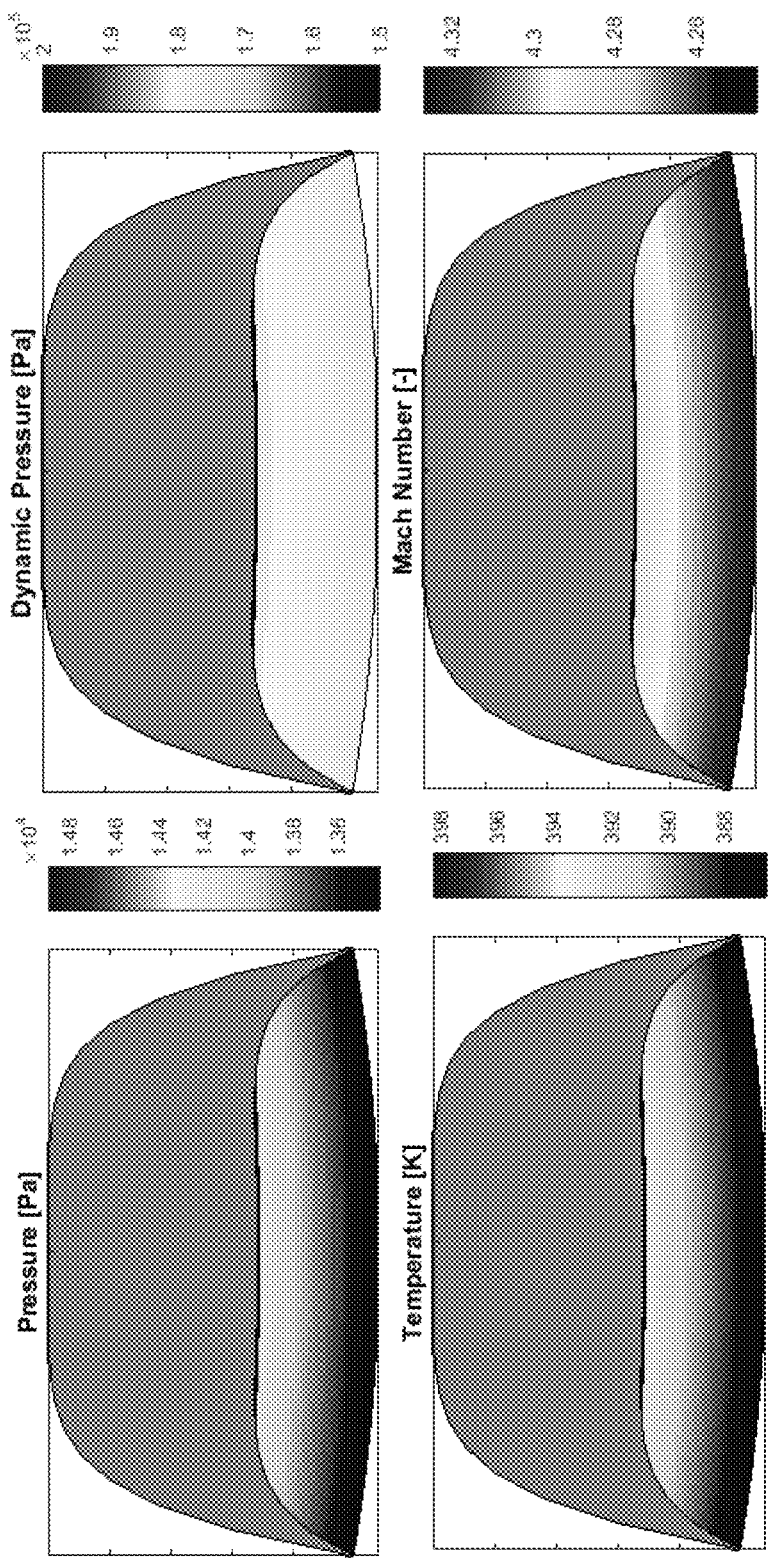
FIG. 11 shows example waverider nosetip inlet conditions for geometry in FIG. 9 at Mach 6 and 50 kPa.

An example for the output contours of the scramjet isolator inlet conditions is presented in FIG. 11. Revisiting FIG. 7 for reference, one may notice that the maximum Mach number as well as the minimum post-shock temperature and pressure are found directly behind the shock, corresponding to the fixed inner lower surface of the inlet manifold. The variation in each of the flow variables presented in FIG. 7 is observed in the radial direction of the inlet profiles presented in FIG. 11. The degree to which the flow field is captured toward the imaginary generating body where the flow variables approach more desirable pressure but less desirable drag and temperature depends on the design radius of the lower inlet surface as well as the aspect ratio of the inlet manifold. It is critical to note that this design radius and the top-surface generating curve uniquely define the leading edge; i.e., the upper internal inlet manifold is shapeable; but the leading edge, bottom inner inlet manifold, and top surface of the waverider nosetip are strictly rigid based on the initial design.

The sample of the output conditions for the referenced model presented in FIG. 11 is for Mach 6, 223K, 1.3 kPa static pressure, at 50 kPa flight dynamic pressure free stream conditions that are modified by the waverider inlet manifold to approximately an average of Mach 4.3, 390K, and 14 kPa at the scramjet inlet. The higher inlet static pressure enables more efficient combustion, more than 10:1 in this example, and the compression ratio can be tuned by the inlet geometry and shock angle. The compression ratio is increased slightly through geometry modification by capturing more of the near-body flow field, whereas it can be significantly varied by changing the shock angle. As will be demonstrated with the three case studies below, a larger shock angle slows the flow speed more significantly, reduces the Mach number, and increases both the temperature and pressure. The effect can be thought of intuitively as an energy exchange between potential and kinetic energy of the incoming flow that is governed by the shock angle and implemented with the leading edge location design.

Figure 12:
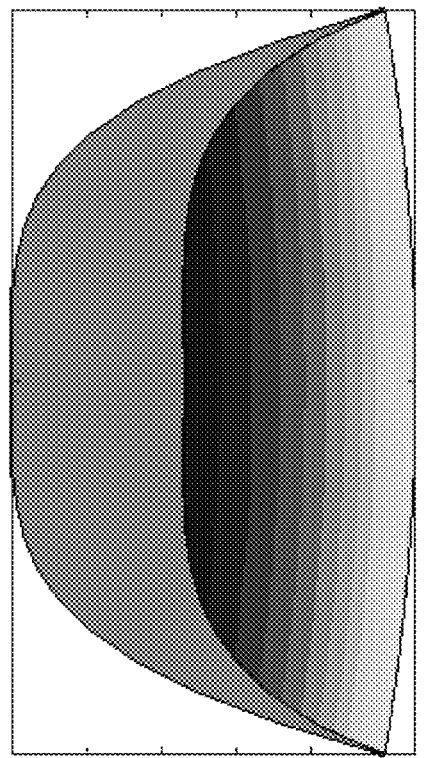
FIG. 12 shows example 10°-shock waverider inlet Mach contour at Mach 6 (left) and Mach 7 (right)
Figure 12:
Figure 12:
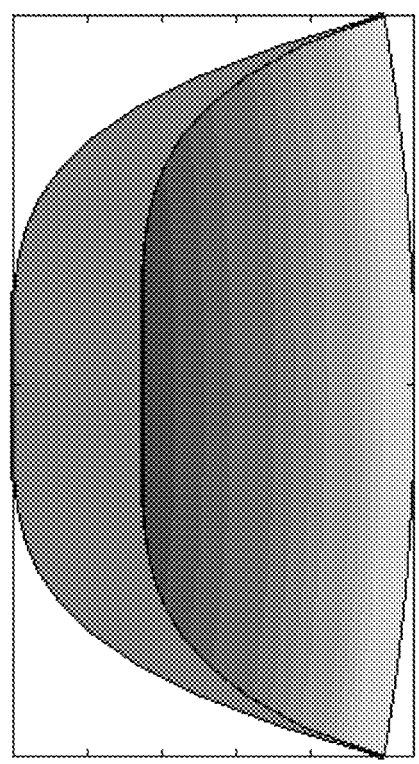

The utility of the waverider leading edge manifold is that it produces conditions at the scramjet intake that are more desirable than the free stream conditions captured by a planar shock because the near-body or near-shock conditions can be preferentially captured, which provides several additional degrees of freedom compared to the traditional planar shock inlet. The utility of the shapeable stream surface on the inside of the waverider leading edge manifold is that the inlet area-averaged conditions can be matched for multiple free stream conditions, as illustrated in FIG. 12 for both Mach 6 (left) and Mach 7 (right) free stream conditions. Note that the leading edge and the upper surface are rigid in this configuration, and the lower inlet surface is shaped to produce the desired stream surface as a function of flight Mach number. The upper inlet manifold is shaped with Mach number in order to match the stream surface created by the post-shock flow field. The degree of shaping required is dependent up on the sharpness of the conical shock and the range of Mach numbers traversed.

Figure 13:
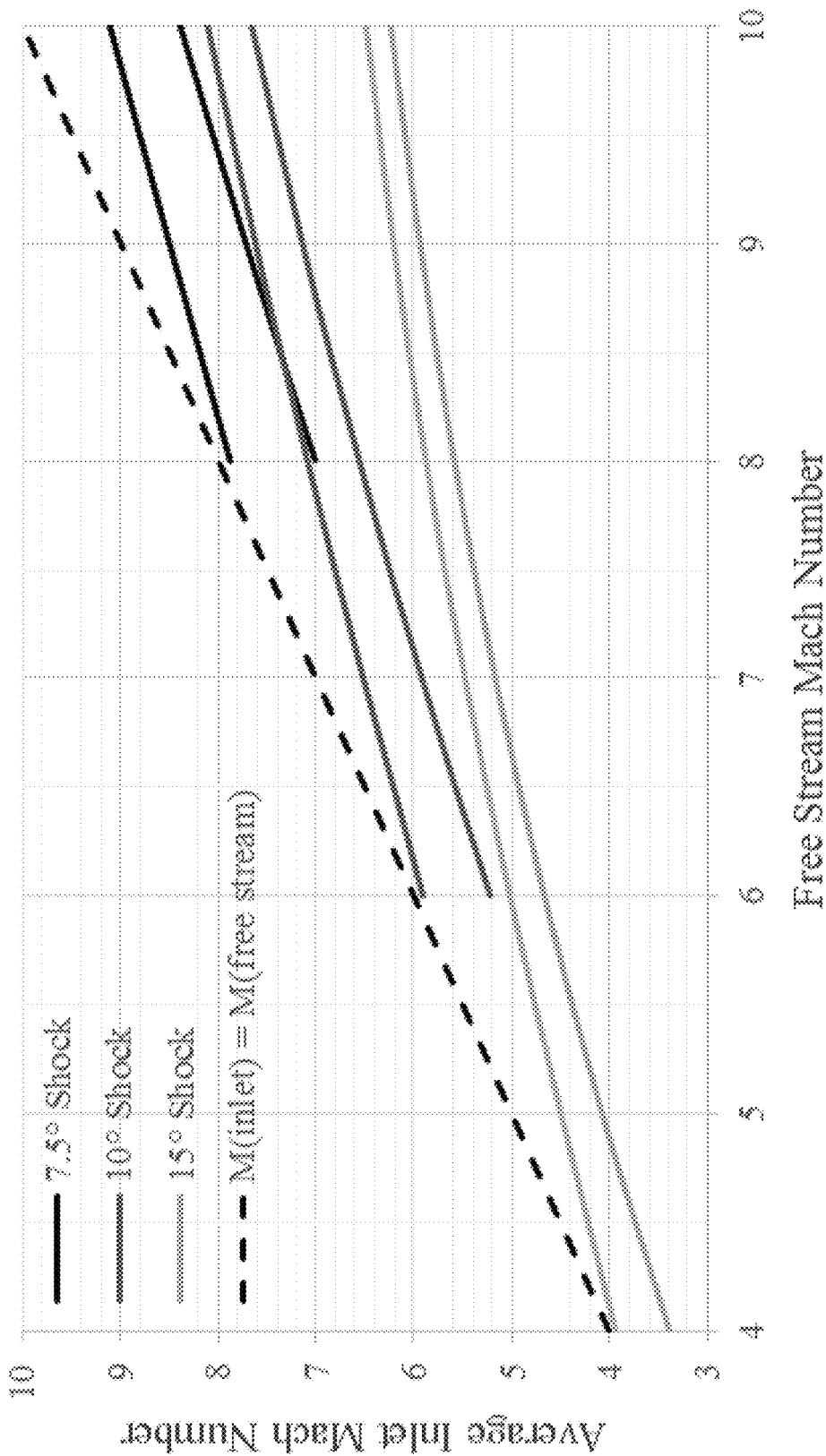
FIG. 13 shows waverider inlet condition limits with free stream conditions and design shock angle.

The resulting relationship between the free stream Mach number and the conditions achievable at the inlet by flexing the inlet manifold to match the appropriate stream surface is depicted in FIG. 13. The figure should be interpreted as an upper and lower limit for average inlet Mach number achievable for a particular flight Mach number, but is slightly restricted by the choice of basic inlet geometry and the range of flexibility achievable with a particular structural design. For example, given a waverider inlet designed for a 10° shock angle, a desired inlet condition of Mach 6.0 is achievable for flight Mach numbers ranging from approximately 6.2 to 7.1, which will be determined by the specific rigid geometry design. A steeper design shock angle corresponds to a higher compression ratio at the expense of increased drag. It therefore follows that an optimization problem may be constructed for the tradeoff between scramjet engine performance parameters and aerodynamic coefficients of the composite vehicle.

Figure 14:
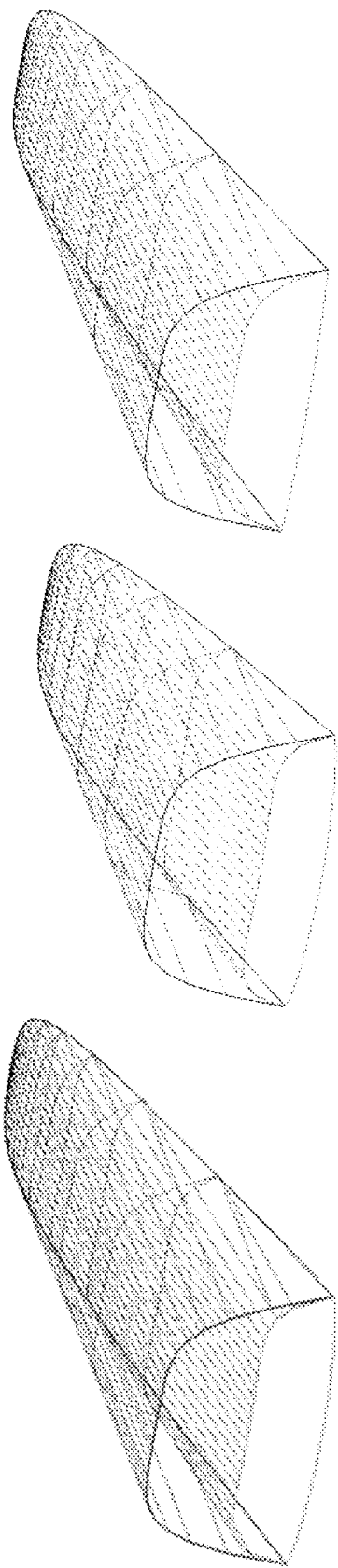
FIG. 14 shows case study inlets at Mach 6 (left to right): near-body, near-shock, steeper-shock near-body.

Next presented are numerical results for three representative waverider inlet manifolds, depicted in FIG. 14 for a common Mach number of 6. Each case was run at a fixed altitude of 30 km with Mach number varied at integer values between 5 and 8 for the isolator inlet contours and at a higher resolution of 0.25 Mach number and 3 km for the inlet area-averaged surface plots with flight Mach number and altitude. Each of the contours in the following subsections have 1,000 divisions between the normalization limits given by the post-shock extrema of the Taylor-Maccoll flow field.

The temperature, pressure, and Mach number flow field from inviscid similarity theory is depicted at the isolator inlet cross section as a contour plot, each scaled between the post-shock value and the near-body value for the imaginary generating cone, as depicted in FIG. 7. The isolator inlet contours are presented in order to illustrate the typical value and local range of conditions achieved by each manifold shape across the selected Mach range. The next figure in each subsection depicts the inlet area-averaged Mach number, pressure, and temperature. The final two figures in each subsection depicts the inlet area-averaged flight conditions across altitude and free-stream Mach number in the context of ratios that would be of use for parametric evaluation of a quasi-one-dimensional engine performance model for a concept vehicle with one of the inlet types considered here. The application of these candidate inlet manifolds to such a model is outside the scope of the present work, but is recommended as a natural progression; as is the optimization of the nosetip top surface and leading edge rigid designs with the concept of inlet shaping for retaining high performance for vehicle aerodynamics and propulsion across a wider flight envelope than can be achieved without a shapeable waverider-derived inlet manifold.

It should be noted that the shape of the inlet manifold will also produce both a pressure and viscous friction drag, as will the vehicle design behind the isolator inlet cross section considered here. As an example, the friction correlation used for high speed flow past a flat plate for an approximation of this external frictional drag component may be used. A summary of the free stream stagnation temperature and pressure with Mach number for the 30 km altitude considered is presented in FIG. 15.

Figure 16:
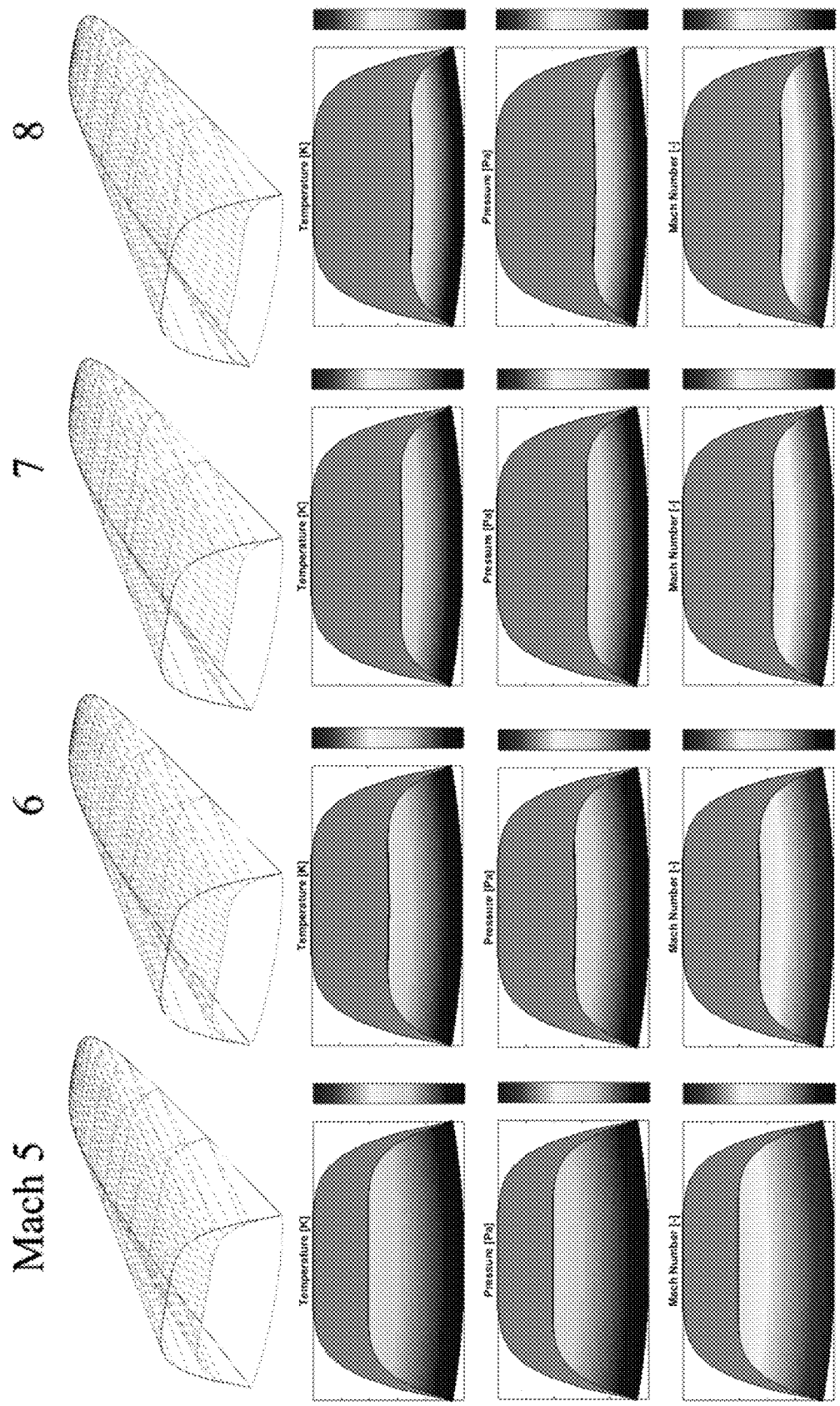
FIG. 16 shows baseline waverider inlet contours for (top to bottom) temperature, pressure, and Mach number.

The required shaping of the inner inlet manifold across Mach number for a reference leading edge computed from a 15° conical shock is presented along the top row of FIG. 16, where the leading edge and top surface of the waverider inlet manifold are rigid and the corresponding inlet cross section is indicated at 1520. Although the shape of the inner upper inlet stream surface is moderately different across Mach number, the area of the surface is consistent to within a small fraction. This observation prompts the suggestion that a shapeable upper inlet manifold to the degree illustrated in FIG. 16 would enable the on-design operation of the waverider inlet manifold as a shock-compression leading edge across the range of Mach numbers considered here. It is also worth noting that the Mach Number Independence Principle requires asymptotic convergence to a stationary state of the stream surface, and subsequent marginal variations for incremental changes in Mach number as it is increased. The variation between the stream surface curvature for Mach 6 compared to Mach 7, and Mach 7 compared to Mach 8, illustrates this concept in FIG. 16.

Figure 17:
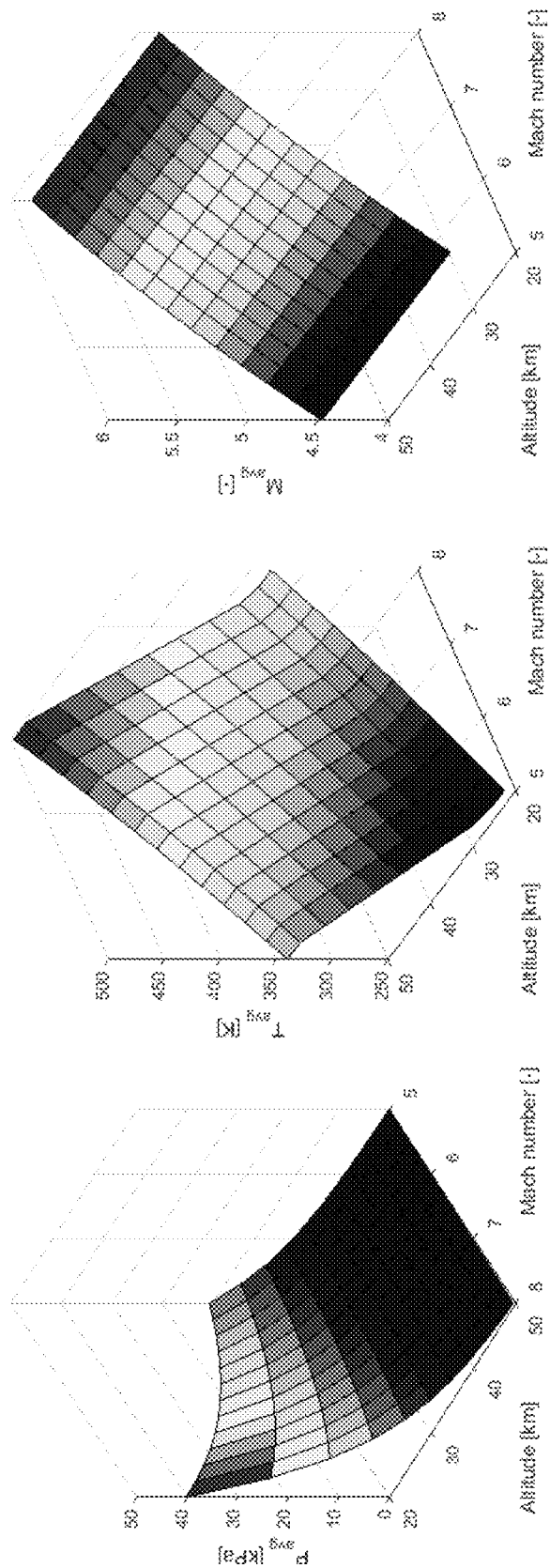
FIG. 17 shows inlet area-averaged flow variables as functions of Mach number and altitude.
Figure 18:
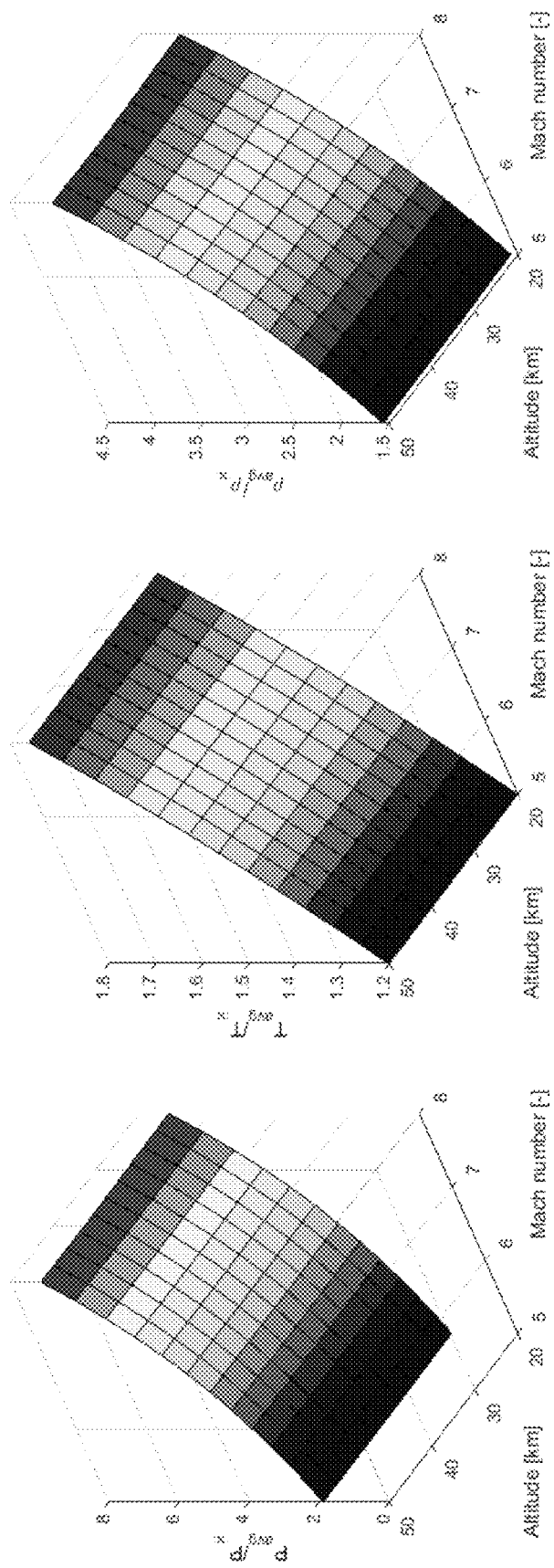
FIG. 18 shows inlet area-averaged flow variable ratios as functions of Mach number and altitude.

Examining the baseline configuration in FIG. 16, higher flight Mach number operation tends to result in the same absolute variation across the inlet flow field but presents a stronger spatial gradient, while an examination of the compression ratio in FIG. 18 reveals a significant increase in compression ratio with Mach number. The Mach number average at the inlet in FIG. 17 is strictly a function of the inlet design and the flight Mach number, but is not affected by variation in the free stream conditions because the velocity magnitude of the vehicle is adjusted with free stream conditions in order to achieve the desired flight Mach number. The temperature and pressure, however, are directly affected by free stream values, including the thermoclines and thermopause regions of the Standard Atmosphere. Since, aside from the thermopauses at either end of the altitude range considered here, the temperature generally climbs with altitude across the range considered, the average inlet temperature increases with both altitude and Mach number. The temperature ratio, however, depicted in FIG. 18, is constant across altitude and is strictly a function of Mach number. The compression ratio appears to climb at near-exponential rates with flight Mach number, which is an important feature to account for the increased drag sustained at higher speeds. The compression ratio does not, however, vary with altitude; suggesting design and performance challenges at low altitude where high density results in high drag forces, and also at high altitude where the low density results in low absolute pressures fed to the combustor.

Figure 19:
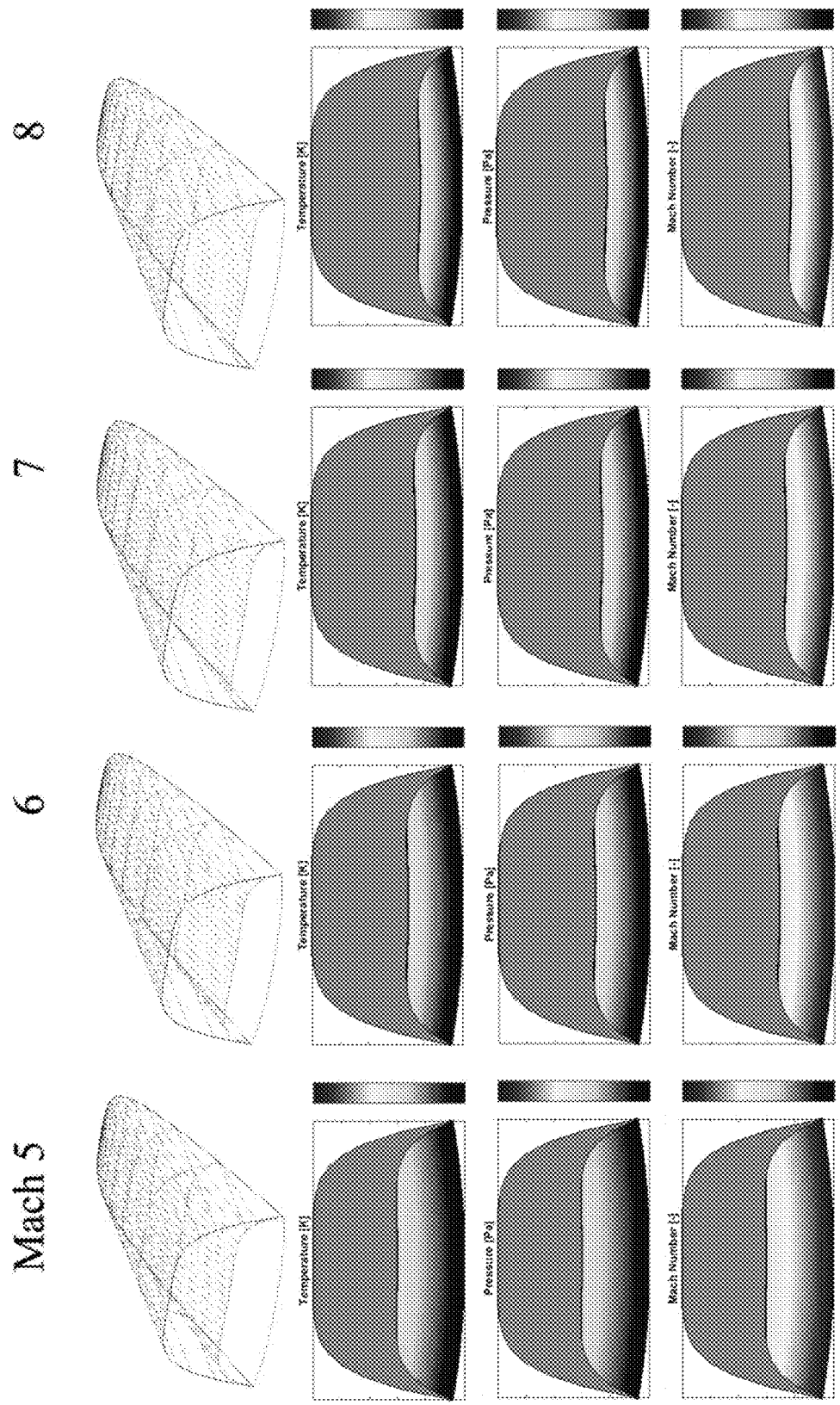
FIG. 19 shows steeper-shock waverider inlet contours for (top to bottom) temperature, pressure, and Mach number.
Figure 20:
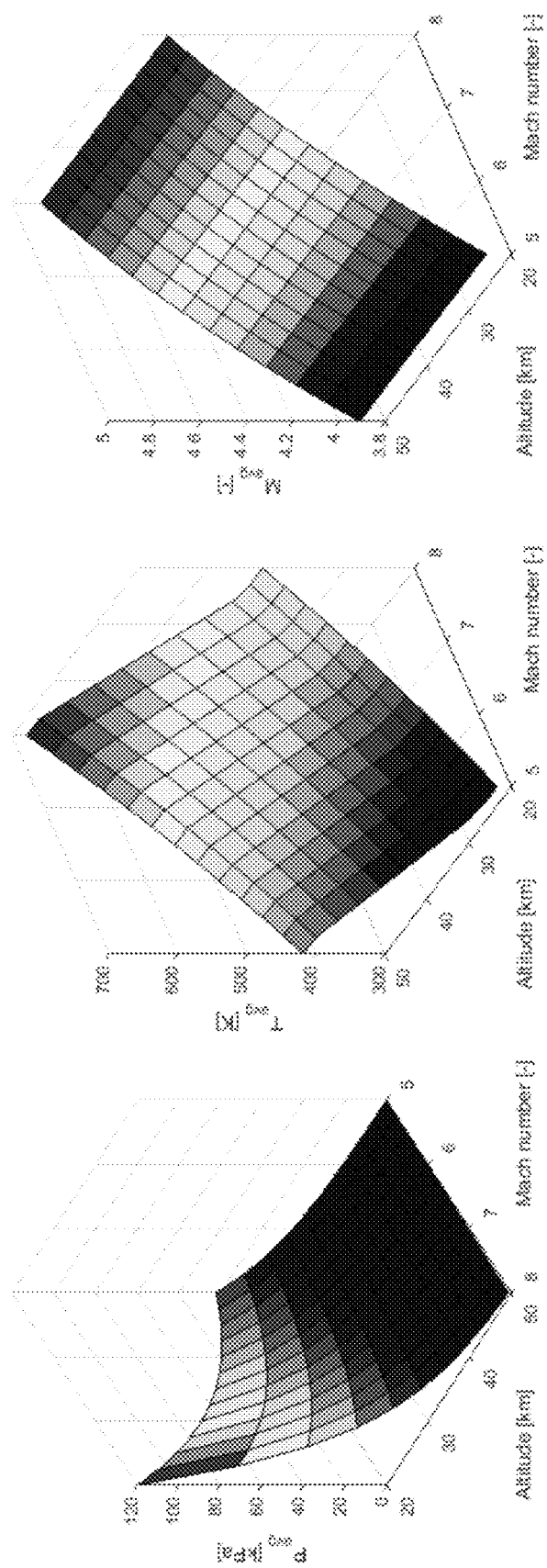
FIG. 20 shows inlet area-averaged flow variables as functions of Mach number and altitude.
Figure 21:
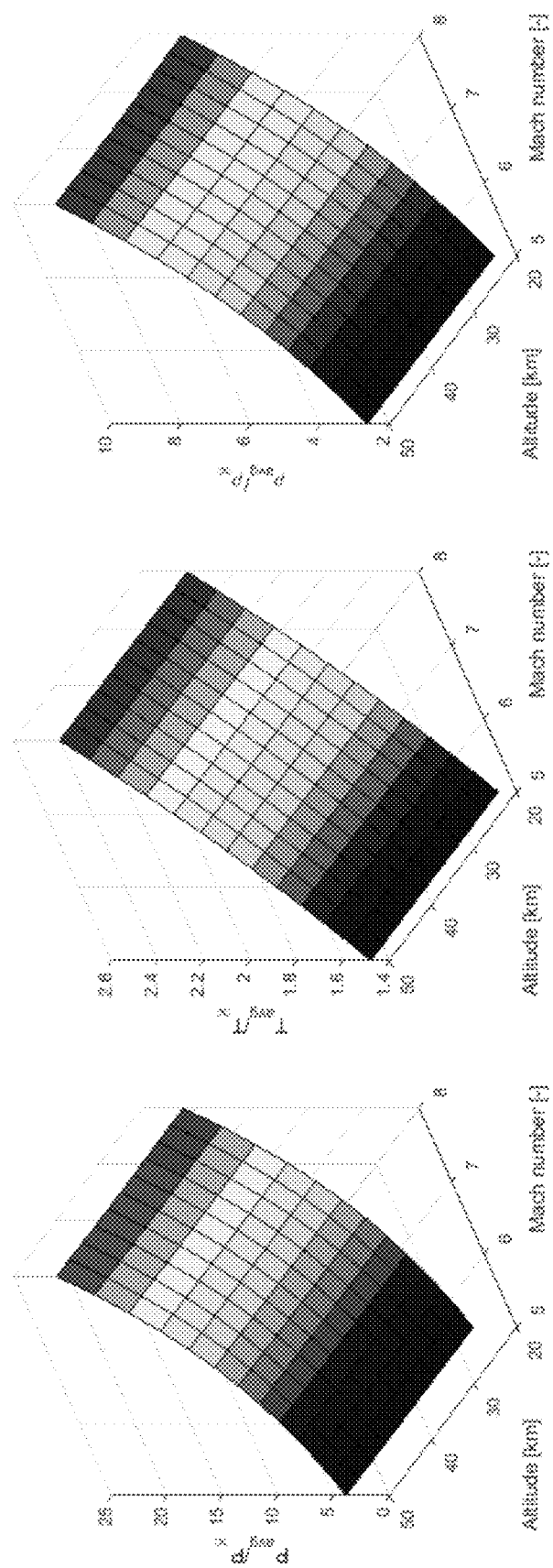
FIG. 21 shows inlet area-averaged flow variable ratios as functions of Mach number and altitude.

Similar qualitative relationships are observed in FIGS. 19-21, but with interesting subtleties derived from the more obtuse shock. The inlet temperature and pressure reach significantly higher values, while the inlet Mach number is everywhere lower. The compression ratio is more than doubled compared to the baseline design. This, combined with the drastic increase in temperature and the steeper inlet geometry necessitating a higher drag coefficient for the same flight Mach number, suggests that steep inlet manifolds may be used to increase compression ratio for achieving desirable combustion conditions. It is worth noting that the relative variation between the minimum and maximum compression ratio across Mach number for each inlet remains the same. An examination of the inlet contours in FIG. 19 further reveals that the flow field gradients are greater for this design than for the baseline, largely due to the reduced inlet cross sectional area at each Mach number. The implication in comparing the baseline design to the same generating curve on a steeper shock angle is that an inlet manifold designer should weigh the tradeoff between combustor performance with increased compression ratio and the associated increase in pressure-induced drag versus a reduced compression ratio and lower temperature of a shallower shock angle. The compression ratio varies from approximately 2:1 to 7:1 for the baseline design compared to approximately 4:1 to 21:1 for the steeper shock design.

Figure 22:
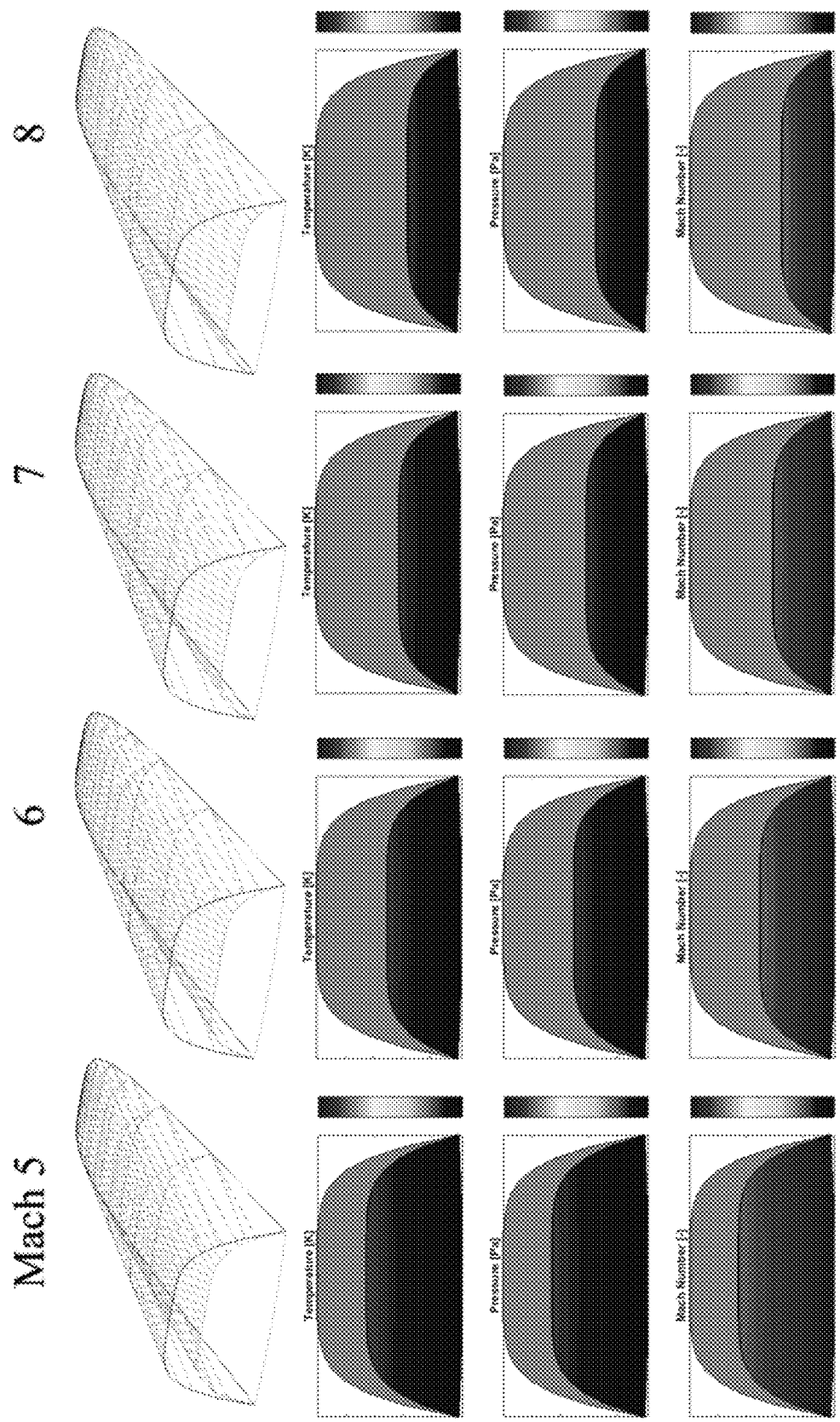
FIG. 22 shows near-shock waverider inlet contours for (top to bottom) temperature, pressure, and Mach number.
Figure 23:
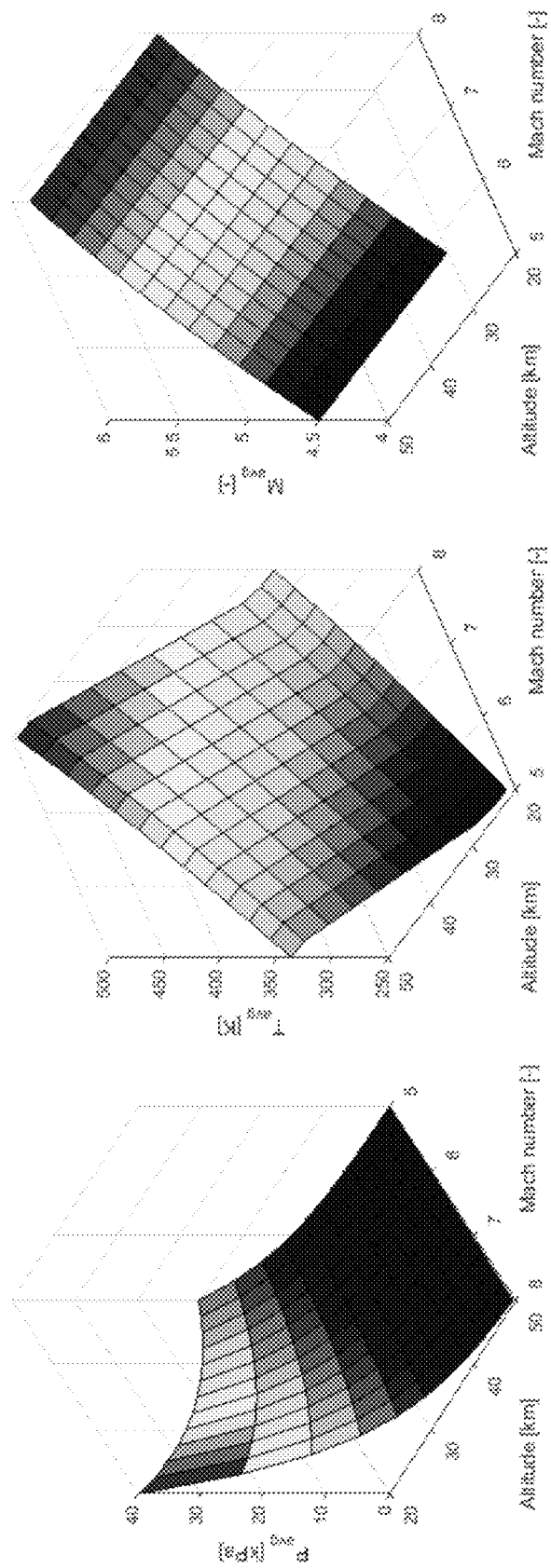
FIG. 23 shows inlet area-averaged flow variables as functions of Mach number and altitude.
Figure 24:
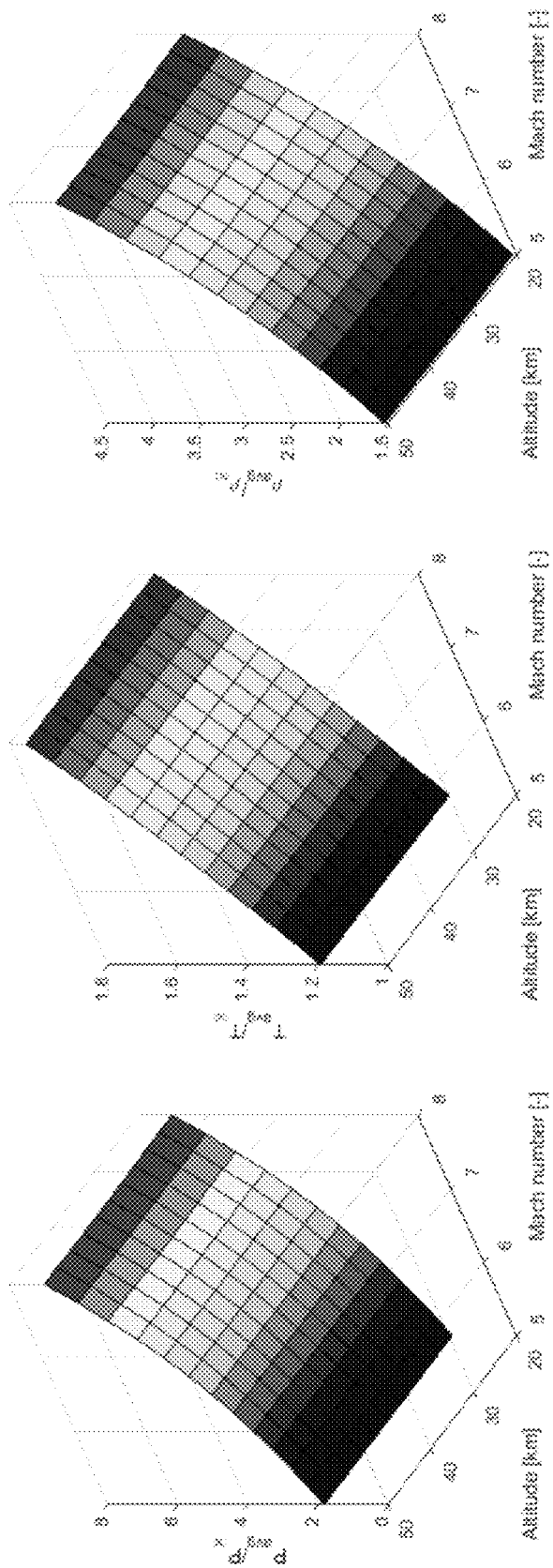
FIG. 24 shows inlet area-averaged flow variable ratios as functions of Mach number and altitude.

Referring now to FIGS. 22-24, the third design type considered has the same generating curve and design shock angle as the baseline design, but with the critical difference that the design shock radius for the bottom surface of the inlet is much larger than the baseline, corresponding to the waverider lying very close to the conical shock boundary as depicted in FIG. 9. This results in very small variations in the post-shock conditions and begins to approach the performance of a planar shock. In fact, in the limit that the design radius tends to infinity, the post-shock conditions will replicate those of a planar shock. This design results in a much smaller fraction of the shock-to-cone flow field being captured, which will omit the conditions near the imaginary generating cone and most of the flow field between. The compression ratio is observed to be a few percent lower than the baseline case that captures more of the higher-pressure region; however, the temperature is correspondingly slightly reduced. The primary benefit of the near-shock flow field is the uniformity of the inlet flow conditions at the expense of reduced compression ratio. Since the first and third inlet manifolds are designed from the same conical shock, the flow contours have identical limits and can be directly visually compared. This first design inlet contains significantly wider variations in flow variables that may have significant implications on the combustion process downstream, despite having similar but slightly more desirable inlet-averaged conditions as depicted in FIGS. 17 and 18 compared to FIGS. 23 and 24. The presumably more desirable average inlet conditions of the baseline design are contrasted with the softer gradients across the inlet cross section of the third design and suggests that a complete analysis of the downstream airframe and engine must be considered in order to declare which configuration is preferable.

The near-shock construction of a waverider inlet manifold has been shown to produce significantly less variation and softer gradients than the first two inlet designs that were intended to capture a larger fraction of the shock-to-cone flow field. This, again, is due to the fact that each design must capture the post-shock conditions but is free to determine which further fraction of the shock-to-cone flow field is worth additionally capturing. The most desirable temperature conditions lie on the backside of the shock, while the most desirable compression ratio requires a larger fraction of the flow field. The highest Mach number occurs directly behind the shock wave, which may result in complications for mixing and combustion efficiency for configurations that result in significant spatial gradients. Additional caution must be exercised in the selection of a high compression ratio as this will produce a high pressure force on the inclined inlet surface and necessarily be accompanied by an increase in pressure drag. The engine performance benefits as a result of increased pressure ratio must be considered as a tradeoff with the increase in drag.

In consideration of the performance plots with altitude and Mach number, shock angle is a preferred method for selecting a compression ratio. Fortunately, an increasing Mach number results in a correspondingly increasing compression ratio that may help ameliorate the quadratic increase in drag force with speed. For design constraints, the low end of the operational Mach range is determined by the minimum attached shock angle for a given Mach number while there is no upper limit for Mach number for a given shock angle. The Mach Number Independence Principle is observed in the marginal variations in inlet contour in FIGS. 16, 19 and 22 as Mach number is increased, suggesting that the required flexibility and shaping of the inlet geometry discussed is more practical at higher Mach number and becomes increasingly difficult at lower Mach number. As observed in FIG. 19, a steeper shock angle results in lesser variance of the stream surface location and is more preferable from a materials and flexibility perspective. It should finally be noted that the inviscid analysis presented here represents merely an approximation to the geometry and performance of a shock-derived inlet manifold. Exemplary implementations may include thickening of walls and blunting of leading edges that may alter the performance as predicted herein, yet this also provides motivation to accept a rigid stream surface as a compromise for small variations in stream surface geometry as observed for steeper shocks and high Mach number operation.

Exemplary embodiments may not include an attached shock at the leading edge as considered herein. Due to thickness of the vehicle wall near the leading edge and the radius at the leading edge exemplary embodiments may include an unattached shock at the leading edge whose standoff distance and downstream effects can be determined with viscous treatment of fully three-dimensional computational fluid dynamics or experiment. Implications on isolator manifold flexibility and inlet manifold flexibility, engine performance due to area cross section variation, and possible materials and deflection range constraints must also be considered in exemplary embodiments. The utility of a low-cost, reduced-order method such as that described here is in the approximate evaluation of a large design space and identification of generally preferred configurations in order to select a small subset of candidates for more detailed design and analysis. The model described can be implemented in just a few CPU-seconds whereas even reduced-order CFD models for the inlet geometry alone may require many orders of magnitude more resources just to develop an approximation to the inviscid flow field of the waverider geometry considered here.

Figure 25:
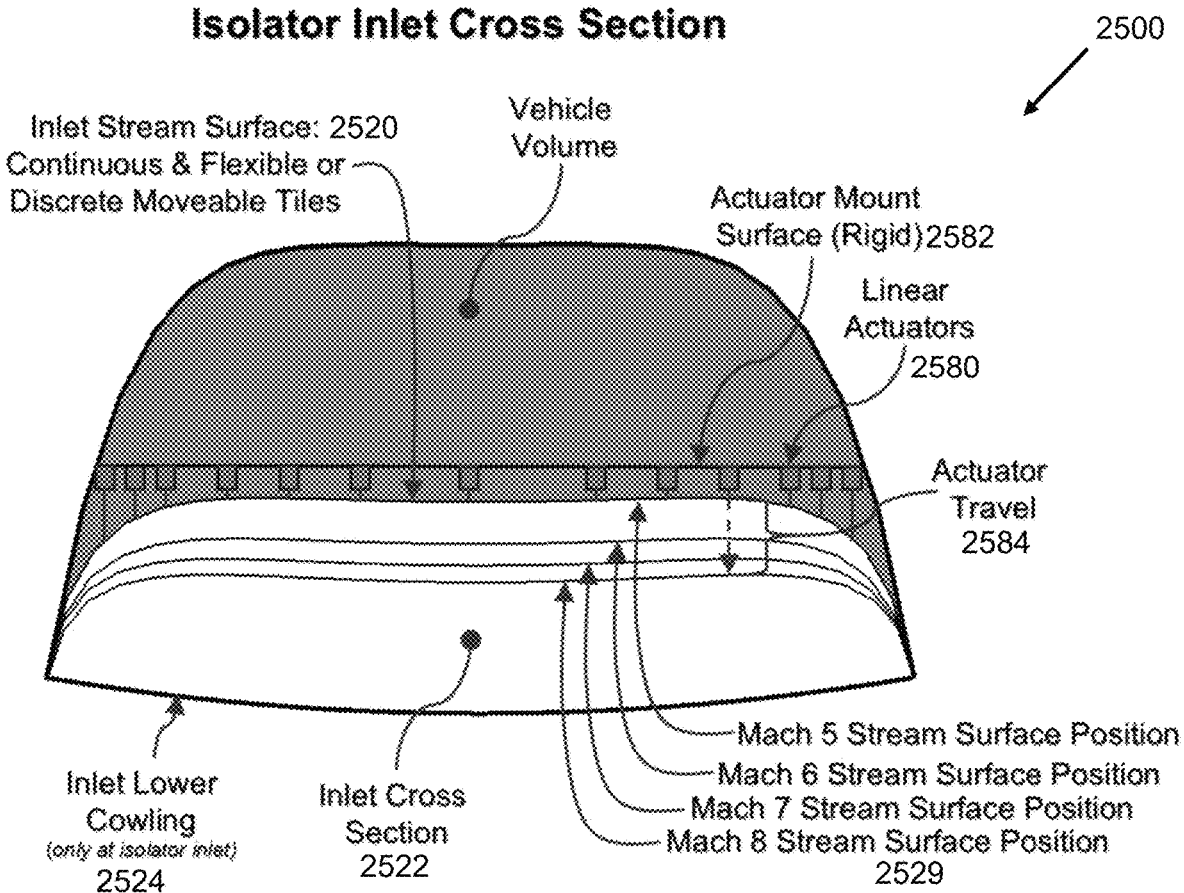
FIG. 25 shows an exemplary shapeable inlet manifold for a hypersonic scramjet.

An exemplary inlet is shown in schematic cross-section in FIG. 25 at 2500. The inlet stream surface 2520 may be controlled via one or more actuators 2580 and may be, for example, linear actuators as shown. The actuators 2580 may be attached at one end to an actuator mount surface 2582 at a fixed end and may actuate across an actuator travel distance 2584 to control the size and shape of the inlet cross-section 2522 defined between the inlet stream surface 2520 and the inlet lower cowling 2524. Example positions for Mach 5-8 are shown as examples at 2529.

Exemplary inlet stream surfaces may be made out of, for example, a continuous surface (e.g., flexible metal or flexible ceramic) or out of a plurality of rigid and/or flexible tiles (e.g., metal or ceramic). Temperature-based shaping based on differences in local stiffness may also be used. The design for temperature-based shaping may be accomplished with CFD simulations for altitude and Mach number, computing local temperature map, and computing required thickness map (or mismatched CTE material placement) in order to satisfy desired range of Mach number. In any case, surface material should have high service temperature and oxidation resistance.

Figure 26:
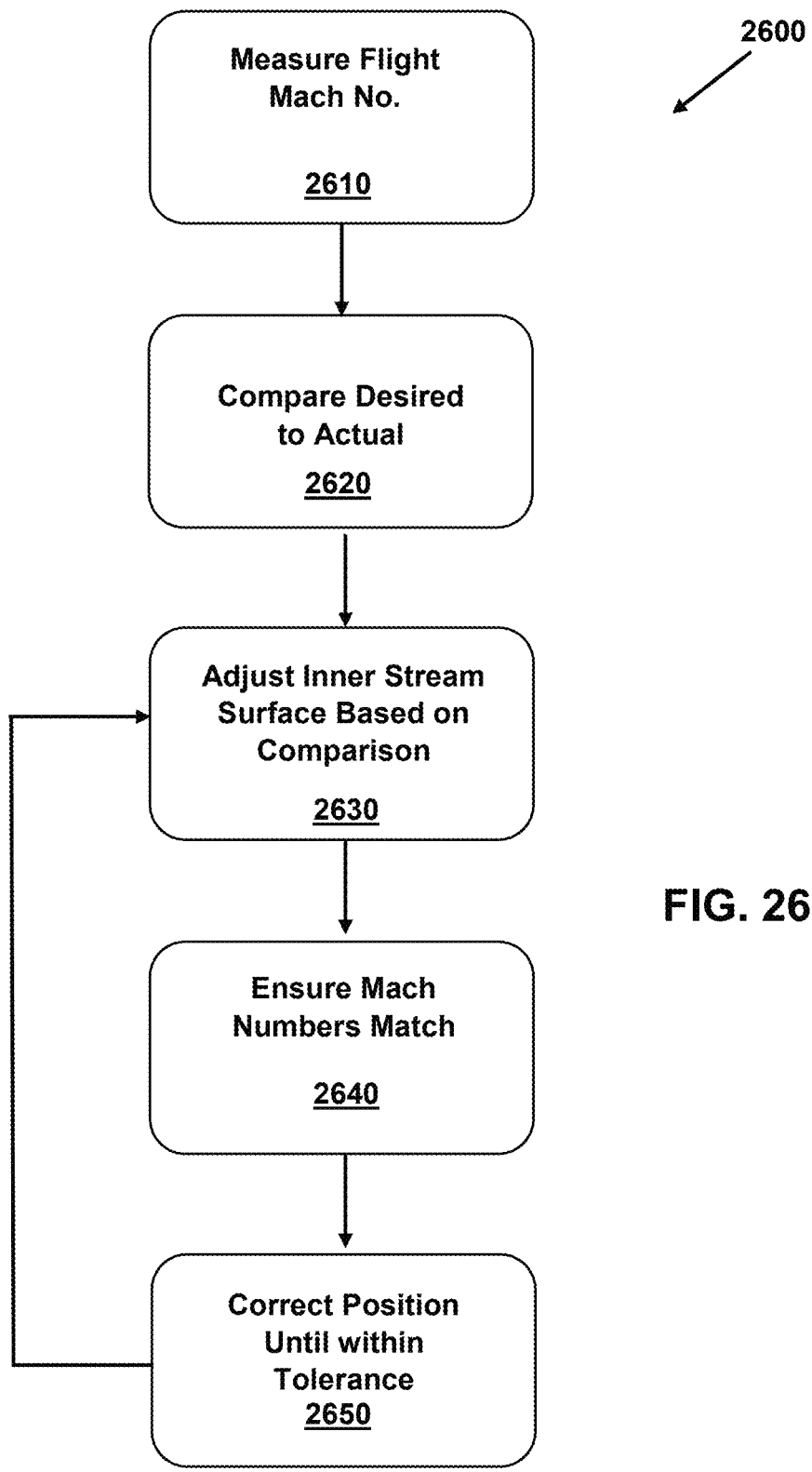
FIG. 26 shows an exemplary control method for operating an exemplary shapeable inlet manifold.

Referring now to FIG. 26, an exemplary control method is shown at 2600. At block 2610, the flight Mach number is measured, for example, with a pitot tube integrated into the scramjet inlet. At block 2620, the measured value may be compared against current Mach-number-specified position of the waverider inner stream surface. At block 2630, an adjustment to the inner stream surface is made in the desired direction based on this comparison. For example, one or more linear actuator positions may be changed to flex a continuous ceramic inner stream surface in the desired direction. At block 2640, a step of ensuring that the measured Mach number matches the Mach-number-specified inner stream surface position is conducted. In particular, the method would directly measure the stagnation pressure and static pressure and use these values to compute Mach number using the supersonic compressible flow pitot relation. At block 2650, the position of the inner stream surface is corrected until the system is within a predetermined tolerance. In other words, at block 2650, the method would measure position, actuate to desired position from measured position, check accuracy and iterate if necessary.

In relation to the method 2600 described above, a Pitot tube may be used to measure the Mach number and a GPS unit may be used, for example, to determine altitude and speed. Alternatively, for example, an inertial measurement unit (in combination with the GPS, or separately) may be used to determine the altitude and speed. Mach number determination may be made from standard atmosphere model or free-stream temperature and/or pressure probes.

It is noted that an exemplary method may increase or decrease position of a point-control actuator to find minimum in required force. The stream surface represents a stable equilibrium and a minimum in the position maintenance force. Too low of a position will detach the shock and compress the air pocket, pushing the surface back up. Too high of a position will create an expansion that pulls the surface back down.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shapeable waverider inlet manifold for a hypersonic scramjet comprising:
    an inlet lower cowling;
    a mount surface;
    an inlet stream surface movably coupled to the mount surface, wherein the inlet lower cowling and an inlet profile of the inlet stream surface define an opening of the shapeable waverider inlet manifold allowing fluid flow therethrough;
    wherein the inlet stream surface is configured to have a first disposition relative to the inlet lower cowling defining a first inlet shape of the opening and a second disposition relative to the inlet lower cowling different from the first disposition defining a second inlet shape of the opening, thereby providing respective first and second flow characteristics through the inlet manifold during flight, and
    wherein a change from the first disposition to the second disposition includes a change in shape of the inlet profile of the inlet stream surface in response to varying flight conditions to maintain attachment of a shock wave generated by the inlet stream surface along an entire length of the inlet stream surface leading edge, thereby ensuring that the waverider inlet manifold remains a waverider.

2. The shapeable waverider inlet manifold of claim 1, further comprising an electronic controller configured to control the inlet stream surface to maintain leading edge shock attachment at the opening, thereby ensuring that the waverider inlet manifold remains a waverider as flight Mach number changes.

3. The shapeable inlet manifold of claim 1, further comprising an electronic controller, wherein the electronic controller is configured to perform the steps of:
    measuring a flight Mach number;
    comparing the measured flight Mach number to a current Mach-number-specified-by-position;
    adjusting the inlet stream surface of the shapeable inlet manifold towards a desired disposition, thereby maintaining a state of leading edge shock attachment along the entire length of the inlet stream surface leading edge, based on the comparing;
    iteratively ensuring that successive measured flight Mach numbers match respective successive Mach-numbers-specified-by-position by correcting respective successive dispositions of the inlet stream surface until a difference between each respective successive measured flight Mach numbers and Mach-numbers-specified-by-position is within a predetermined tolerance.

4. The shapeable waverider inlet manifold of claim 1, wherein a change from the first disposition to the second disposition includes a change in location of the inlet stream surface with respect to the inlet lower cowling in order to maintain leading edge shock attachment and aerodynamic benefits of a waverider inlet shape.

5. The shapeable waverider inlet manifold of claim 1, wherein a change from the first disposition to the second disposition includes a change in shape of the inlet stream surface in order to maintain leading edge shock attachment and aerodynamic benefits of a waverider inlet shape.

6. The shapeable waverider inlet manifold of claim 1, further comprising one or more actuators attached to the mount surface and to the inlet stream surface and configured to actuate the inlet stream surface from the first disposition to the second disposition in order to maintain leading edge shock attachment and aerodynamic benefits of a waverider inlet shape.

7. The shapeable waverider inlet manifold of claim 6, wherein the one or more actuators are linear actuators.

8. The shapeable waverider inlet manifold of claim 1, wherein the inlet stream surface is a continuous flexible surface configured to be actuated at any number of locations in order to form a curved shape that conforms to the inflowing airstream.

9. The shapeable waverider inlet manifold of claim 1, wherein the inlet stream surface comprises a plurality of rigid tiles.

10. The shapeable waverider inlet manifold of claim 1, wherein the inlet stream surface includes variation in local stiffness across its extent, and wherein the inlet stream surface is configured to change from the first disposition to the second disposition via temperature-based shaping resulting from differences in local stiffness.

11. The shapeable inlet manifold of claim 1, wherein the shapeable waverider inlet is three-dimensional in design, varying in geometry in three dimensions, enabling integration with scramjets of varying geometries, including axi-symmetric and cylindrical.

12. The shapeable inlet manifold of claim 1, wherein the shapeable waverider inlet compresses the incoming air stream isentropically, resulting in less entropy-production and stagnation pressure losses in the post shock flow as compared to non-waverider shapeable inlets.

* * * * *